United States Patent
Yildiz

(10) Patent No.: US 8,639,979 B2
(45) Date of Patent: *Jan. 28, 2014

(54) METHOD AND SYSTEM FOR PROVIDING IMMUNITY TO COMPUTERS

(75) Inventor: Mehmet Yildiz, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,309

(22) Filed: Aug. 22, 2012

(65) Prior Publication Data

US 2012/0317438 A1 Dec. 13, 2012

Related U.S. Application Data

(63) Continuation of application No. 12/334,601, filed on Dec. 15, 2008, now Pat. No. 8,271,834.

(51) Int. Cl.
*G06F 11/00* (2006.01)
(52) U.S. Cl.
USPC .................................. 714/26; 714/2; 714/32
(58) Field of Classification Search
USPC ............................................. 714/26, 2, 32
See application file for complete search history.

(56) References Cited

U.S. PATENT DOCUMENTS

| | | | |
|---|---|---|---|
| 6,018,567 A | 1/2000 | Dulman | |
| 6,108,419 A | 8/2000 | LaMacchia et al. | |
| 6,542,993 B1 * | 4/2003 | Erfani | 726/1 |
| 6,961,874 B2 | 11/2005 | Lodrige | |
| 7,464,408 B1 | 12/2008 | Shah et al. | |
| 7,523,348 B2 | 4/2009 | Anand et al. | |
| 7,580,994 B1 * | 8/2009 | Fiszman et al. | 709/223 |
| 7,702,959 B2 | 4/2010 | Hwang et al. | |
| 8,245,302 B2 * | 8/2012 | Evans et al. | 726/23 |
| 8,261,126 B2 * | 9/2012 | Sosnosky et al. | 714/13 |
| 8,271,834 B2 * | 9/2012 | Yildiz | 714/26 |
| 8,353,045 B2 * | 1/2013 | Karabey et al. | 726/25 |
| 8,499,348 B1 * | 7/2013 | Rubin | 726/22 |
| 2002/0007237 A1 | 1/2002 | Phung et al. | |
| 2002/0012011 A1 | 1/2002 | Roytman et al. | |
| 2003/0005102 A1 * | 1/2003 | Russell | 709/223 |

(Continued)

OTHER PUBLICATIONS

Sidiroglou et al. Building a Reactive Immune System for Software Services, Network Security Lab, Department of Computer Science, Columbia University.

(Continued)

*Primary Examiner* — Loan L. T. Truong
(74) *Attorney, Agent, or Firm* — George R. McGuire; Blaine T. Bettinger; Bond Schoeneck & King, PLLC

(57) ABSTRACT

A method and system for providing immunity to a computer system wherein the system includes an immunity module, a recovery module, a maintenance module, an assessment module, and a decision module, wherein the immunity module, the recovery module, the maintenance module and the assessment module are each linked to the decision module. The maintenance module monitors the system for errors and sends an error alert message to the assessment module, which determines the severity of the error and the type of package required to fix the error. The assessment module sends a request regarding the type of package required to fix the error to the recovery module. The recovery module sends the package required to fix the error to the maintenance module, which fixes the error in the system.

15 Claims, 2 Drawing Sheets

(56) References Cited

U.S. PATENT DOCUMENTS

| | | | |
|---|---|---|---|
| 2003/0101367 A1 | 5/2003 | Bartfai et al. | |
| 2004/0078732 A1* | 4/2004 | Meaney | 714/57 |
| 2004/0205239 A1 | 10/2004 | Doshi et al. | |
| 2005/0086342 A1 | 4/2005 | Burt et al. | |
| 2005/0193430 A1* | 9/2005 | Cohen et al. | 726/25 |
| 2005/0204150 A1 | 9/2005 | Peikari | |
| 2006/0007901 A1* | 1/2006 | Roskowski et al. | 370/338 |
| 2006/0017975 A1 | 1/2006 | Ly et al. | |
| 2006/0052965 A1* | 3/2006 | Nodwell | 702/119 |
| 2006/0053181 A1 | 3/2006 | Anand et al. | |
| 2006/0184824 A1 | 8/2006 | Hillman | |
| 2006/0195745 A1 | 8/2006 | Keromytis et al. | |
| 2006/0212477 A1* | 9/2006 | Murphy et al. | 707/104.1 |
| 2007/0136580 A1 | 6/2007 | Anand et al. | |
| 2007/0174716 A1 | 7/2007 | Erdtmann et al. | |
| 2007/0180380 A1 | 8/2007 | Khavari et al. | |
| 2007/0262879 A1 | 11/2007 | Greiner et al. | |
| 2007/0271422 A1 | 11/2007 | Osaki | |
| 2007/0271510 A1* | 11/2007 | Grigoriu et al. | 715/533 |
| 2007/0294221 A1* | 12/2007 | Chen et al. | 707/3 |
| 2008/0005281 A1* | 1/2008 | Hsueh et al. | 709/219 |
| 2008/0005555 A1* | 1/2008 | Lotem et al. | 713/150 |
| 2008/0107269 A1 | 5/2008 | Gehrmann et al. | |
| 2008/0126063 A1 | 5/2008 | Beer et al. | |
| 2008/0168242 A1 | 7/2008 | Eberbach et al. | |
| 2008/0201703 A1* | 8/2008 | Lerum et al. | 717/172 |
| 2009/0012931 A1 | 1/2009 | Appa et al. | |
| 2009/0106363 A1* | 4/2009 | Fallen et al. | 709/204 |
| 2009/0153326 A1 | 6/2009 | Doumi et al. | |
| 2009/0204845 A1 | 8/2009 | Herscovitz et al. | |
| 2009/0217235 A1* | 8/2009 | Suenbuel | 717/104 |
| 2009/0254970 A1* | 10/2009 | Agarwal et al. | 726/1 |
| 2009/0271165 A1 | 10/2009 | Averill et al. | |
| 2009/0281929 A1 | 11/2009 | Boitet et al. | |
| 2010/0005531 A1* | 1/2010 | Largman et al. | 726/24 |
| 2010/0082513 A1* | 4/2010 | Liu | 706/46 |
| 2010/0242111 A1* | 9/2010 | Kraemer et al. | 726/22 |

OTHER PUBLICATIONS

12334601-PDF from public pair of parent case, U.S. Appl. No. 12/334,601 as of Aug. 21, 2012.

* cited by examiner

METHOD AND SYSTEM FOR PROVIDING IMMUNITY TO COMPUTERS

CROSS-REFERENCE TO RELATED APPLICATIONS

The present application is a continuation of U.S. patent application Ser. No. 12/334,601, filed on Dec. 15, 2008, and entitled "Method and System for Providing Immunity to Computers," the entire contents of which are incorporated herein.

FIELD OF INVENTION

The present invention relates generally to methods and systems for providing protection from system attack and more particularly, to methods and systems for automatic recovery and immunization from attack.

BACKGROUND

Enterprise level information technology data centers experience severe problems related to their server infrastructure particularly in distributed server platforms. These data centers are based on large multi-tier networked environments which serve the mission's critical applications for internal and/or external customers of information technology service providers. The major problems stem from the complexity of the distributed server infrastructure.

These data centers are dynamic in nature as their distributed server infrastructure elements rapidly change due to a number of factors such as functional requirements, business growth and technological advancements to mention a few. Operational efficiency of a distributed server infrastructure is a major issue. It is common to see ongoing reported faults in many systems' management reporting tools.

Currently, there are some recovery solutions that are used to resolve system disruptions, such as moving the computing workload to a backup device upon reaching a measured threshold and then waiting for the original device/equipment to be fixed manually. Such a solution is no longer acceptable to business owners. Businesses performing critical operations require more autonomic server infrastructures than are currently available.

In order to address these problems, IBM conceived the notion of autonomic computing, the ability for important computing operations and computer systems to run and regulate themselves without the need for human intervention, much in the same way the autonomic nervous system regulates and protects the human body. The idea behind autonomic computing was to lessen the spiraling demands for skilled information technology resources, reduce complexity and to drive computing into a new era that could better exploit its potential to support higher order thinking and decision making.

This has becoming an emerging focus because of the immediate need to solve the skills shortage and the rapidly increasing size and complexity of the world's computing infrastructure. It is time to design and build computing systems capable of running themselves, adjusting to varying circumstances, and preparing their resources to handle most efficiently the workloads we put upon them.

More than four hundred product features in thirty six distinct IBM products have autonomic computing capabilities. Each of these capabilities are based in part on self-configuring, healing, optimizing or protecting technologies. They span the entire IBM product and services portfolio and have autonomic capabilities for all sizes of businesses, including small and medium sized business. There remain needs and desires to provide more complete and comprehensive autonomic computing systems and methods.

SUMMARY

According to one embodiment of the present invention, a system for providing immunity to a computer system is provided wherein the system includes an immunity module, a recovery module, a maintenance module, an assessment module, and a decision module, wherein the immunity module, the recovery module, the maintenance module and the assessment module are each linked to the decision module.

In another aspect of the system, the maintenance module monitors the system for errors and sends an error alert message to the assessment module upon discovery of an error, wherein the assessment module determines the severity of the error and the type of package required to fix the error, wherein the assessment module sends a request regarding the type of required package to the recovery module, wherein the recovery module sends the package required to fix the error to the maintenance module, and wherein the maintenance module fixes the error in the system.

In a further aspect of the system, the recovery module includes a local recovery component, an emergency recovery component, a global recovery component and an alternative recovery component, and wherein the assessment module sends the request regarding the package required to fix the error to the emergency recovery component if the error is severe or sends the request regarding the package required to fix the error to the local recovery component if the error is not severe.

In another aspect of the system, the emergency recovery component sends the package to the maintenance module if the package is contained in the emergency recovery component and if the package is not in the emergency recovery component, the emergency recovery component sends the request regarding the type of package to the local recovery component, wherein the local recovery component sends the package to the maintenance module if the package is contained in the local recovery component.

In still a further aspect of the system, the local recovery component sends the request regarding the type of package to the global recovery component if the package is not contained in the local recovery component, wherein the global recovery component includes packages from a plurality of members, wherein the members contribute packages to the global recovery component and wherein the global recovery component is updated with new packages continuously, and wherein the global recovery component sends the package to the maintenance module if the package is contained in the global recovery component.

In yet another aspect of the system, the global recovery component sends the request regarding the type of package to the alternate recovery component if the package is not contained in the global recovery component, wherein the alternate recovery component includes system generated packages created by the immunity module, wherein the alternate recovery component sends the package to the maintenance module if the package is in the alternate recovery component.

In a further aspect of the system, the alternate recovery component sends the request regarding the type of package to the immunity module if the required package is not contained in the alternate recovery module, wherein the immunity module comprises an error creation component and an error assimilation component, and wherein the immunity module creates the package to fix the error.

In another embodiment of the present invention, a method for providing immunization to a computer system including an immunity module, a recovery module, a maintenance module, an assessment module, and a decision module is provided, wherein the method includes monitoring the system for errors, wherein the monitoring is performed by the maintenance module, upon discovering an error by the maintenance module, sending an error alert message to the assessment module, determining the severity of the error and the type of package required to fix the error, sending a request regarding the type of required package to the recovery module, sending the package required to fix the error from the recovery module to the maintenance module, and fixing the error in the system.

In another aspect of the method, the recovery module includes a local recovery component, an emergency recovery component, a global recovery component and an alternative recovery component, the method further includes sending the request regarding the package required to fix the error to the emergency recovery component if the error is severe or to the local recovery component if the error is not severe.

In a further aspect of the method, the emergency recovery component checks to see whether it has the package, if the package is in the emergency recovery component, the package is sent to the maintenance module, if the package is not in the emergency recovery component, the request regarding the type of package is sent to the local recovery component, wherein the local recovery component sends the package to the maintenance module if the package is contained in the local recovery component.

In yet another aspect of the method, if the package is not contained in the local recovery component, the request regarding the type of package is sent to the global recovery component, wherein the global recovery component sends the package to the maintenance module if the package is in the global recovery component. The global recovery component contains packages from a plurality of members of an alliance which is engaged in solving computer errors and problems that arise during computing, wherein the members contribute packages to the global recovery component and wherein the global recovery component is updated with new packages continuously.

In still another aspect of the method, if the package is not contained in the global recovery component, the request regarding the type of package is sent to the alternate recovery component, wherein the alternate recovery component sends the package to the maintenance module if the package is in the alternate recovery component. The alternate recovery component comprises system generated packages created by the immunity module.

In yet a further aspect of the method, if the package is not contained in the alternate recovery component, the request regarding the type of package is sent to the immunity module, wherein the immunity module includes an error creation component and an error assimilation component, wherein the immunity module creates the package to fix the error.

In a further embodiment of the present invention, a computer program product encoded in a computer readable medium for instructing a computer system to provide immunization thereto is provided wherein the computer system includes an immunity module, a recovery module, a maintenance module, an assessment module, and a decision module, the program code configured to cause the computer system to perform the method including monitoring the system for errors by the maintenance module, upon discovering an error by the maintenance module, sending an error alert message to the assessment module, determining the severity of the error and the type of package required to fix the error by the assessment module, sending a request regarding the type of required package to the recovery module, sending the package required to fix the error from the recovery module to the maintenance module, and fixing the error in the system.

In another aspect of the computer program product, the recovery module includes a local recovery component, an emergency recovery component, a global recovery component and an alternative recovery component, the program code further configured to send the request regarding the package required to fix the error to the emergency recovery component if the error is severe or to the local recovery component if the error is not severe, and if the package is not in the emergency recovery component, the program code is configured to send the request regarding the type of package to the local recovery component, wherein the local recovery component sends the package to the maintenance module if the package is not contained in the local recovery component.

In yet another aspect of the computer program product, the program code is further configured to send the request regarding the type of package to the global recovery component if the package is not contained in the local recovery component and wherein the global recovery component sends the package to the maintenance module if the package is contained in the global recovery component. The global recovery component comprises packages from a plurality of members, wherein the members contribute packages to the global recovery component, and wherein the global recovery component is updated with new packages continuously.

In still another aspect of the computer program product, the program code is further configured to send the request regarding the type of package to the alternate recovery component if the package is not contained in the global recovery component, wherein the alternate recovery component comprises system generated packages created by the immunity module, and wherein the alternate recovery component sends the package to the maintenance module if the package is contained in the alternate recovery component.

In a further aspect of the computer program product, the program code further configured to send the request regarding the type of package to the immunity module if the package is not contained in the global recovery component, wherein the immunity module comprises an error creation component and an error assimilation component, and wherein the immunity module creates the package to fix the error.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

For the purposes of this patent description and claims, the inventor intends that the following term be understood to have the following definition.

"Present invention" means at least some embodiments of the present invention; references to various feature(s) of the "present invention" throughout this document do not mean that all claimed embodiments or methods include the referenced feature(s).

Embodiments of the present invention provide a system and method for immunity and autonomic recovery of computer systems such as distributed server infrastructure systems within large data centers.

Figure 1:
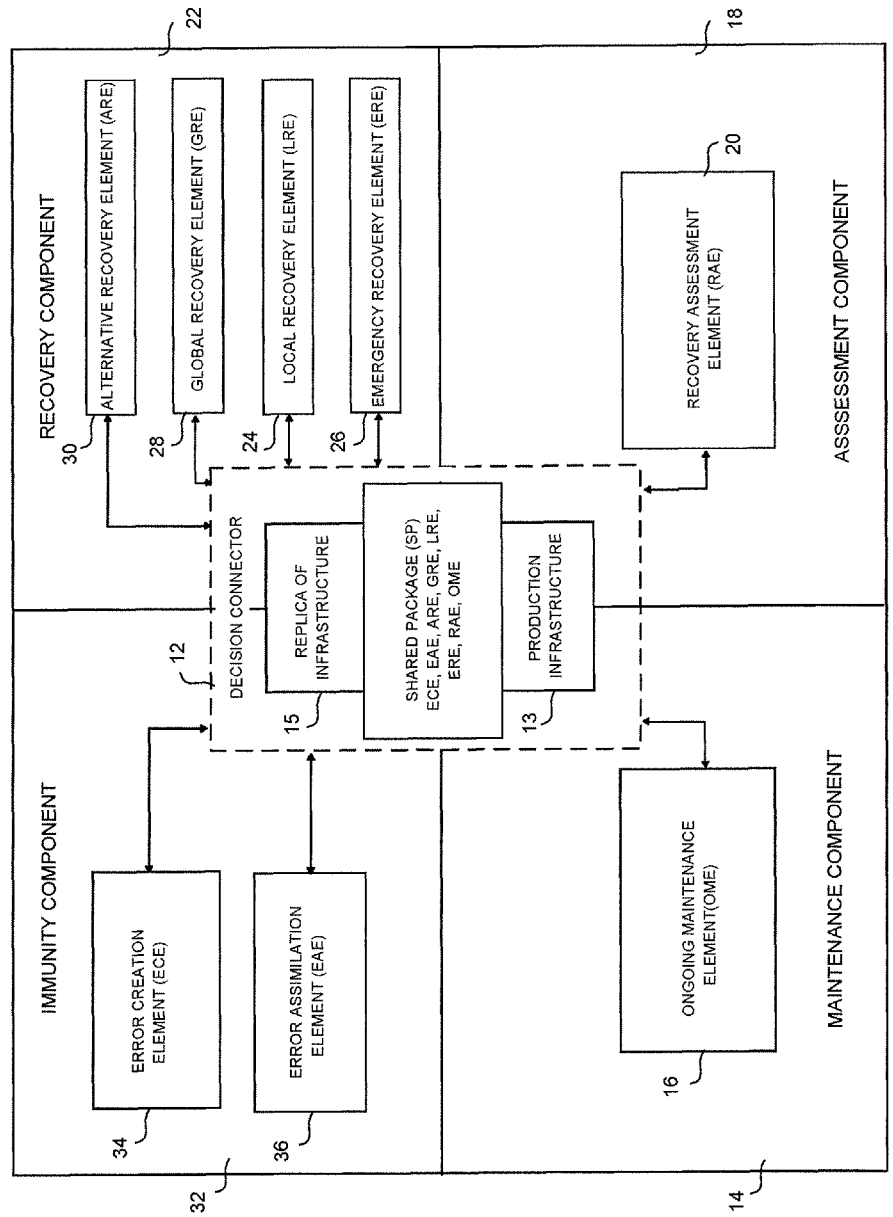
FIG. 1 shows an embodiment of a system herein.

Reference is made to FIG. 1, which shows a system 10 for providing autonomic recovery and immunity to a system such as a server infrastructure. Examples of systems for implementation of the embodiments herein include, but are not limited to, application, database and systems management servers.

System 10 includes a maintenance module 14 for continuous monitoring of the system's health. The maintenance module includes an ongoing maintenance component 16 for providing ongoing checks of the system, to determine if any errors are occurring or likely to occur. The maintenance module 16 is linked to the decision connector 12, which oversees the decisions of system 10. The decision connector 12 includes a production infrastructure 13 and a replica infrastructure 15. Since changes in the production infrastructure 13 are not allowed due to high or continuous availability reasons, any unscheduled change will happen in the replica infrastructure 15, which is a non-production environment. The replica infrastructure 15 is also used to direct computing processes and resources from the production infrastructure 13 to the replica infrastructure 15 in case of an unexpected event or disaster in the production infrastructure 13. The major focus of the replication infrastructure 15 is to add extra contingency to the overall system and be a contributing factor to the self healing aspect of the systems.

System 10 further includes an assessment module 18 for assessing the errors detected by maintenance module 16. Assessment module 18 includes a recovery assessment component 20, which assesses the severity of the errors detected by maintenance module 16. For example, an error may be considered severe/very severe if the system has the potential to fail and loose all or a main portion of all the data. The severity level can be set by the system administrator, or can rely on defaults set by the system. An example of an error that is not considered severe is an error which does not have substantial impact on the overall system. Business owners decide the severity from low to high undertaking a business impact analysis. For example, if error A causes issues affecting 10 users and error B affects 100 users, then error B has a higher severity rate and requires more focus and results in stronger service level penalties by the service providers.

System 10 additionally includes a recovery module 22 for supplying the correct package to correct the error. Recovery module 22 includes four components: a local recovery component 24, an emergency recovery component 26, a global recovery component 28, and an alternative recovery component 30. The level of severity of the problem that needs to be fixed will determine to which component to send the package request. The local recovery component 24 supplies packages for normal or easy-to-fix errors, such as errors affecting only local systems in a smaller context, i.e., an IT system serving only one business unit in a multi-business unit environment. The emergency recovery component 26 supplies packages to fix severe problems, such as, but not limited to, errors which have no immediate solution in the local recovery element and have unexpected and unquantifiable affect in the system. These are mainly unknown and require emergency procedures. The aim 1s to find an immediate "fix" and consider the root causes and other traditional procedures at other components. As an analogy, compare this to the functions of and procedures performed in a hospital's emergency department.

If neither the local recovery component 24 nor the emergency recovery component 26 can supply the requested package, the global recovery component 28 is checked to see if the requested package is available. The global recovery component 28 is the largest repository of globally shared packages, the packages being contributed by members of an alliance that has been formed to address errors and problems that arise in computer software and system technology. The alliance is comprised of a variety of organizations, vendors, system owners, troubleshooting companies and the like, all of whom have the desire to reduce, fix, and eliminate errors that arise in computer software and system technology. Each member of the alliance owns a global recovery component, which is constantly updated by newly produced recovery or "fix" packages. These "fix" packages are all well-tested packages by various sites of incident and problem management databases. Upon receipt of new packages, the global recovery component 28 sends new packages to the local recovery component 24 and the emergency recovery component 26. Accordingly, all the modules are constantly being updated, providing efficiency and reliability.

If the global recovery component 28 is unable to provide the correct package to fix the error, the request is forwarded on to the alternate recovery component 30. The alternate recovery component 28 contains "alternate recovery" packages that resolve incidents and errors unknown to any stakeholders of the system, such as, administrators, developers and architects of the system. These "alternative recovery" packages are machine-generated packages, whereby the machine or system generates a problem and creates a way to fix the problem. As with the global recovery component 28, the alternate recovery component 30 sends new packages to the other recovery components in the recovery module 22, the local recovery component 24, the emergency recovery component 26, and the global recovery component 28. Accordingly, this reduces the time required to correct problems since the number of steps in the process will be fewer if required package us found early on in the process. The alternative recovery packages are received from the immunity module 32, as described below.

System 10 further contains an immunity module 32. This immunity module 32 includes an error creation component 34 and an error assimilation component 36. The error creation component 34 constantly creates errors (i.e., 24 hours a day, 365 days a year), based on a number of pieces of codes, which generate system errors, viruses, Trojan horses, or other malicious system codes that can be modeled by reusing a myriad of structures available from server vendors. It is possible that templates to create malicious software can be used in this instance as algorithms for this purpose. A collection of such templates can be stored to be used for future problem inquiries. The error assimilation component 36 takes the errors created by the error creation component 34 or provided by the templates, uses various algorithms to fix the errors, and creates service "fixing" packages. Furthermore, the error assimilation component 36 tests the packages it creates in the replica infrastructure 15 in which errors can arise. The successfully tested packages are then sent to the alternative recovery component 30 to be used when all traditional means have been exhausted.

The embodiments herein provide a synergetic system spanning several areas including artificial intelligence, distributing computing, autonomic computing, grid computing, pervasive computing, enterprise wide systems management, operations and infrastructure management. The embodiments address server infrastructure problems and produce autonomic solutions in large enterprises by offering a new paradigm in server infrastructure management. When an error occurs there are several mechanisms and alternatives to ensure the computing workload continues and the previous functionality and performance is restored. This ensures that there is a solution for each known error. The proposed solution is available constantly with pre-established infrastructure maintenance policies. More difficult unknown (potential) errors are addressed using a unique layer (immunity) with tow key centers that generate random errors and attempt to solve them.

The system emulates the human health system by leveraging key concepts from immunology (a branch of medical science). It also leverages numerous established information technology technologies and architectural models of traditional and modern systems management, operations and infrastructure domains. It is based on patterned recovery packages generated from four distinct components: immunity, recovery, maintenance, and assessment. These components have a number of sub component and eight different elements serving a duplicated server infrastructure specified in the context of production and the replica. The eight package elements are error creation, error assimilation, ongoing maintenance, alternative recovery, global recovery, local recovery, emergency recovery and recovery assessment.

The elements produce context specialized and pattern-based recovery packages. Each of the component and associated elements are interconnected through another critical element called the decision connector. The system aims at creating pre-established, tested, and mature packages to be used as fast system recovery tools. It uses the human body as an analogy. For example, the pre-established packages emulate the use of both modern and/or the alternative medicines in healing human disorders and diseases in a holistic manner.

Figure 2:
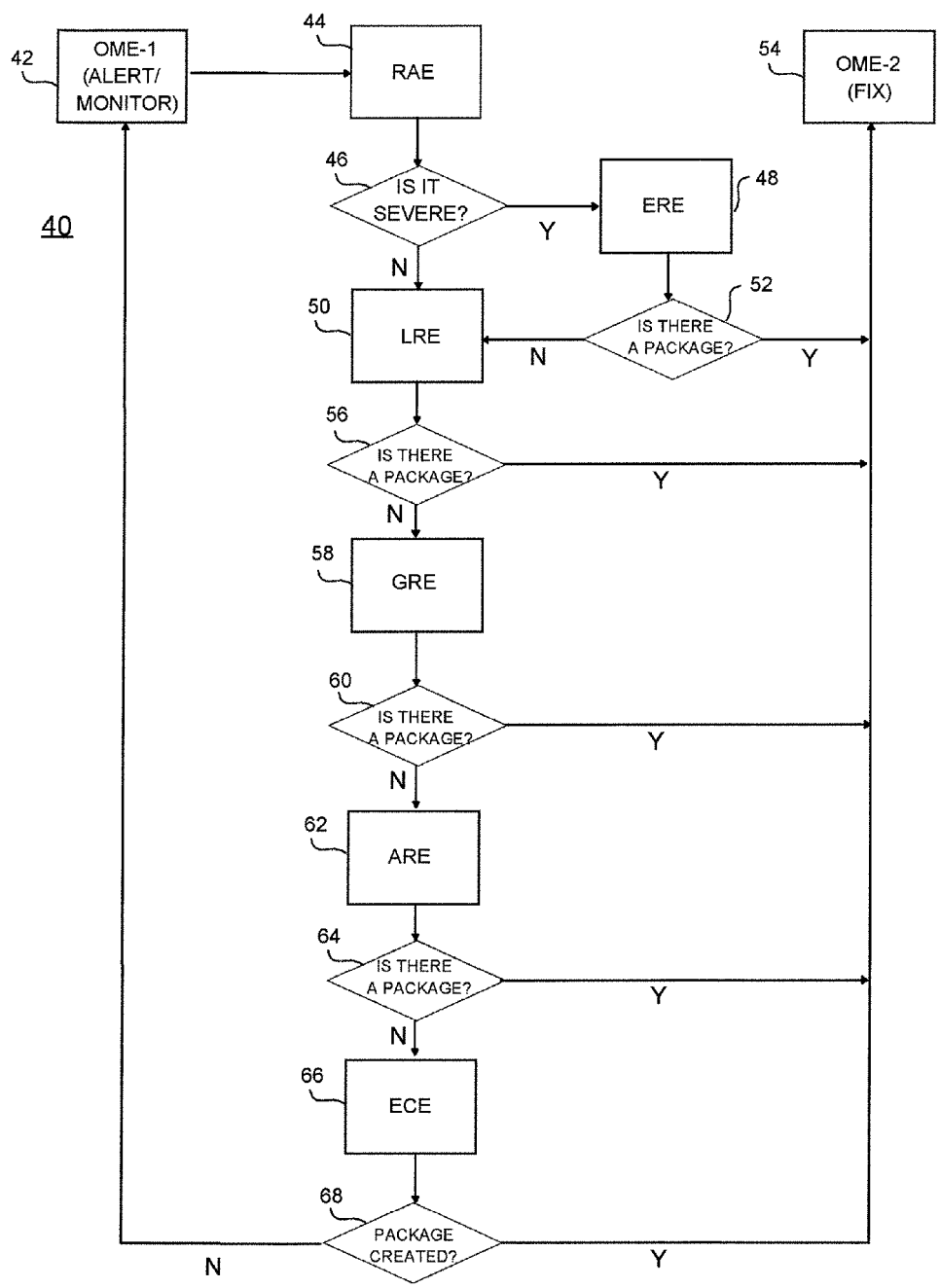
FIG. 2 shows the logic of a method embodiment herein.

FIG. 2 shows an embodiment of a method 40 herein. The method begins at step 42, with the ongoing maintenance component 16 of maintenance module 14 detecting an error in the system. The recovery assessment component 20 of assessment component 18 makes an assessment of the error to determine whether or not the error is severe at step 44. At step 46, the system queries whether the error is severe. If the answer is yes, i.e., the error is severe, a request regarding the type of package required to fix the error is sent to the emergency recovery component 26 of the recovery module 22 at step 48. If the answer is no, i.e., the error is not severe, the request is sent to the local recovery component 24 of recovery module 22 at step 50.

Continuing at step 48 where the request is sent to the emergency recovery component 26, the system queries whether the emergency recovery component 26 contains the requested package at step 52. If the answer is yes, i.e., the emergency recovery component 26 contains the requested package, the emergency recovery component 26 sends the package to the ongoing maintenance component 16 of the maintenance module 14 at step 54, the error is fixed, and the process ends.

Alternatively, if the answer to the query at step 52 is no, i.e., the emergency recovery component 26 does not contain the requested package, a request is sent to the local recovery component 24 of recovery module 22 at step 50. The next query by the system is at step 56, which asks whether there is a package in the local recovery component 24. If the answer is yes, the local recovery component 24 sends the package to the ongoing maintenance component 16 of the maintenance module 14 at step 54, the error is fixed, and the process ends.

If the answer to the query at step 56 is no, i.e., the local recovery component 24 does not contain the requested package, a request is sent to the global recovery component 28 at step 58. The system queries at step 60, whether the global recovery component 28 contains the requested package. If the answer is yes, the global recovery component 28 sends the package to the ongoing maintenance component 16 of the maintenance module 14 at step 54, the error is fixed, and the process ends.

Alternatively, if the answer to the query at step 60 is no, i.e., the global recovery component 28 does not contain the requested package, a request is sent to the alternative recovery component 30 of recovery module 22 at step 62. The system queries at step 64, whether the alternative recovery component 30 contains the requested package. If the answer is yes, the alternative recovery component 30 sends the package to the ongoing maintenance component 16 of the maintenance module 14 at step 54, the error is fixed, and the process ends.

If the answer to the query at step 64 is no, i.e., the alternative recovery component 30 does not contain the requested package, a request is sent to the error creation component 34 of the immunity module 32 at step 66. The system queries at step 68, whether the package has been created by the error creation component 34. If the answer is yes, the error creation component 34 sends the package to the ongoing maintenance component 16 of the maintenance module 14 at step 54, the error is fixed, and the process ends. If the answer to the query at step 68 is no, the process begins all over again at the ongoing maintenance component 16 at step 42. It is possible that a new package has been updated in the recovery module 22 and the error can be fixed during the next progression through the process.

The purpose of this loop is that an assumption of newer possible fixes are produced by myriad other systems that can be updated in the global recovery center. As the immunity center generates constant error packages and if the packages belong to each organization are shared by all other organizations in the alliance, via a spirit of collaboration, system errors will be reduced and in some cases, eliminated. Accordingly, if the organizations share their alternative recovery component outputs in a shared repository which is called the global recovery component, then the server infrastructure problems will reduce dramatically and this will provide substantial gain to the world economy and increase the quality of information technology services.

Embodiments herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, code to provide monitoring for errors by the maintenance module, code to send an error alert message to the assessment module, code to determine the severity of the error and the type of package required to fix the error by the assessment module, code to send a request regarding the type of required package to the recovery module, code to send the package required to fix the error from the recovery module to the maintenance module, code to send the request regarding the package required to fix the error to the emergency recovery component if the error is severe or to the local recovery component if the error is not severe; code to send the request regarding the type of package to the local recovery component if the package is not contained in the emergency recovery component, code to send the package to the maintenance module if the package is in the local recovery component, code to send the request regarding the type of package to the global recovery component if the package is not in the local recovery component, code to send a package to the maintenance module if the package is contained in the global recovery component, code to send the request regarding the type of package to the alternate recovery component if the package is not contained in the global recovery component, code to generate packages created by the immunity module, code to send the package to the maintenance module if the package is in the alternate recovery component, code to send the request regarding the type of package to the immunity module if the package is not contained in the alternate recovery component, code to create a package to fix the error, and code to fix the error in the system.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An automated method for providing immunization to a computer system, the automated method comprising:
   automatically creating, by an error creation component of an immunity module, a plurality of software code errors;
   automatically fixing, by an error assimilation component of the immunity module, at least one of the plurality of software code errors created by the error creation component;
   automatically generating packages by the immunity module, wherein the packages are based on said software code errors;
   automatically storing said generated packages in an alternate recovery module;
   automatically monitoring the system for errors by a maintenance module;
   upon discovering an error by the maintenance module during its monitoring, automatically sending an error alert message from the maintenance module to an assessment module;
   automatically determining the severity of the error by the assessment module;
   categorizing the error as either severe or non-severe;
   automatically determining the type of package required to fix the error by the assessment module;
   automatically sending a request regarding the type of required package from the assessment module to a recovery module, wherein the recovery module is the alternate recovery module if no other recovery module has the required package, wherein the request regarding the package required to fix the error is sent to an emergency recovery component of the recovery module if the error is severe, or is sent to a local recovery component of the recovery module if the error is not severe;
   automatically sending the package required to fix the error from the recovery module to the maintenance module; and
   automatically fixing the error in the system.

2. The automated method of claim 1, further comprising the steps of:
   checking to see whether the emergency recovery component has the package; and
   sending the package to the maintenance module if the emergency recovery component has the package, or sending the request regarding the type of package to the local recovery component if the emergency recovery component does not have the package, wherein the local recovery component sends the package to the maintenance module if the local recovery component has the package.

3. The automated method of claim 2 further comprising the steps of:
   sending the request regarding the type of package to the global recovery component if the local recovery component does not have the package; and
   sending the package from the global recovery component to the maintenance module if the global recovery component has the package.

4. The automated method of claim 3, further comprising the step of continuously updating the global recovery component with new packages from a plurality of members.

5. The automated method of claim 4, further comprising the steps of:
   sending the request regarding the type of package to the alternate recovery component of the recovery module if the global recovery component does not have the package; and
   sending the package from the alternate recovery component to the maintenance module if the alternate recovery component has the package.

6. The automated method of claim 5, further comprising the steps of:
   sending the request regarding the type of package to the immunity module if the alternate recovery component does not have the package; and
   creating the package to fix the error by the immunity module.

7. A system for providing immunity to a computer system comprising:
   an immunity module, wherein the immunity module comprises:
      an error creation component configured to create a plurality of software code errors;
      an error assimilation component configured to fix the plurality of software code errors created by the error creation component; and
      a packaging component configured to generate packages based on said software code errors;
   a recovery module;
   a maintenance module, wherein the maintenance module is configured to monitor the system for errors and send an error alert message to the assessment module upon discovery of an error, and further wherein the maintenance module is further configured to fix the error in the system;
   an assessment module, wherein the assessment module is configured to determine the severity of the error and the type of package required to fix the error, and further wherein the assessment module is configured to send a request regarding the type of required package to an emergency recovery component of the recovery module if the error is severe or to a local recovery component of the recovery module if the error is not severe, wherein the recovery module is configured to send the package required to fix the error to the maintenance module; and
   a decision module, wherein the immunity module, the recovery module, the maintenance module and the assessment module are each linked to the decision module.

8. The system of claim 7, wherein the emergency recovery component is configured to send the package to the maintenance module if the package is contained in the emergency recovery component; and wherein the emergency recovery component is configured to send the request regarding the type of package to the local recovery component if the package is not in the emergency recovery component, and further wherein the local recovery component is configured to send the package to the maintenance module if the package is contained in the local recovery component.

9. The system of claim 8, wherein the local recovery component is configured to send the request regarding the type of package to the global recovery component if the package is not contained in the local recovery component;
   wherein the global recovery component comprises packages from a plurality of members, wherein the members are configured to contribute packages to the global recovery component and wherein the global recovery component is configured to be updated with new packages continuously; and
   wherein the global recovery component is configured to send the package to the maintenance module if the package is contained in the global recovery component.

10. The system of claim 9 wherein the global recovery component is configured to send the request regarding the type of package to the alternate recovery component if the package is not contained in the global recovery component;
    wherein the alternate recovery component comprises system generated packages created by the immunity module;
    wherein the alternate recovery component is configured to send the package to the maintenance module if the package is in the alternate recovery component.

11. The system of claim 10, wherein the alternate recovery component is configured to send the request regarding the type of package to the immunity module if the required package is not contained in the alternate recovery module;
    wherein the immunity module comprises an error creation component and an error assimilation component; and
    wherein the immunity module is configured to create the package to fix the error.

12. A computer program product encoded in a non-transitory computer readable medium for instructing a computer system to provide immunization thereto, the program code comprising:
    means for automatically creating, by an error creation component of an immunity module, a plurality of software code errors;
    means for automatically fixing, by an error assimilation component of the immunity module, at least one of the plurality of software code errors created by the error creation component;
    means for automatically generating packages by the immunity module, wherein the packages are based on said software code errors;
    means for automatically storing said generated packages in an alternate recovery module;
    means for automatically monitoring the system for errors by a maintenance module;
    means for automatically sending an error alert message to an assessment module upon discovering an error by the maintenance module;
    means for automatically determining the severity of the error by the assessment module;
    means for categorizing the error as either severe or non-severe;
    means for automatically determining the type of package required to fix the error by the assessment module;
    means for automatically sending a request regarding the type of required package from the assessment module to a recovery module, wherein the recovery module is the alternate recovery module if no other recovery module has the required package, wherein the request regarding the package required to fix the error is sent to an emergency recovery component of the recovery module if the error is severe, or is sent to a local recovery component of the recovery module if the error is not severe;
    means for automatically sending the package required to fix the error from the recovery module to the maintenance module; and
    means for automatically fixing the error in the system.

13. The computer program product of claim 12, the program code further comprises:
    means for sending the request regarding the type of package to the global recovery component if the package is not in the local recovery component;
    means for continuously updating the global recovery component is updated with new packages from a plurality of members; and
    means for sending the package to the maintenance module if the global recovery component has the package.

14. The computer program product of claim 13, the program code further comprises:
    means for sending the request regarding the type of package to an alternate recovery component of the recovery module if the global recovery component does not have the package; and
    means for generating packages by an immunity module;
    means for storing generated packages in the alternate recovery component; and
    means for sending the package generated by the immunity module from the alternate recovery component to the maintenance module if the alternate recovery component has the package.

15. The computer program product of claim 14, the program code further comprises:
    means for sending the request regarding the type of package to the immunity module if the alternate recovery component does not have the package; and
    means for creating the package to fix the error by the immunity module.

* * * * *